June 24, 1941.　　　N. H. MAGUIRE　　　2,247,096
MOVER'S DOLLY
Filed April 7, 1939
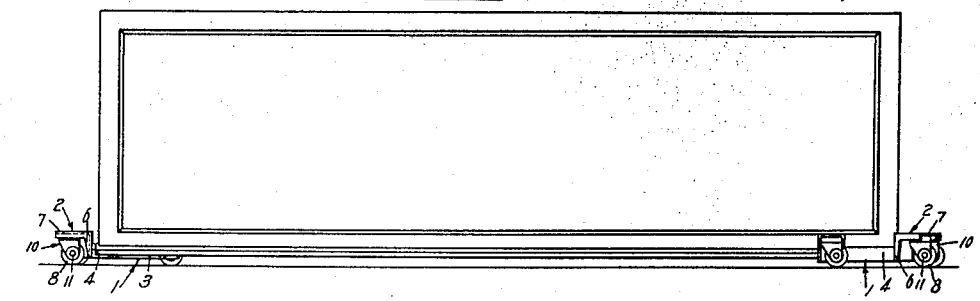
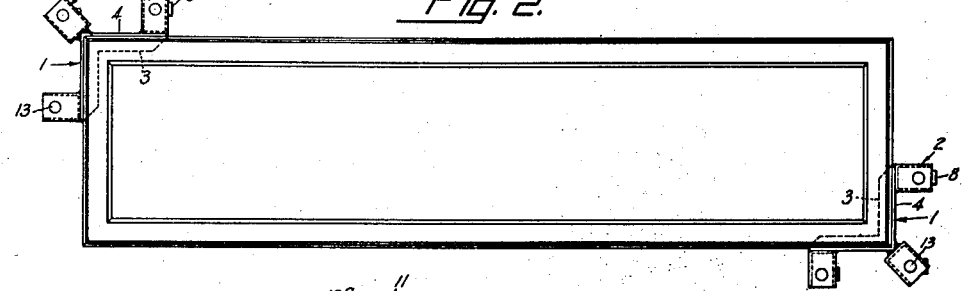
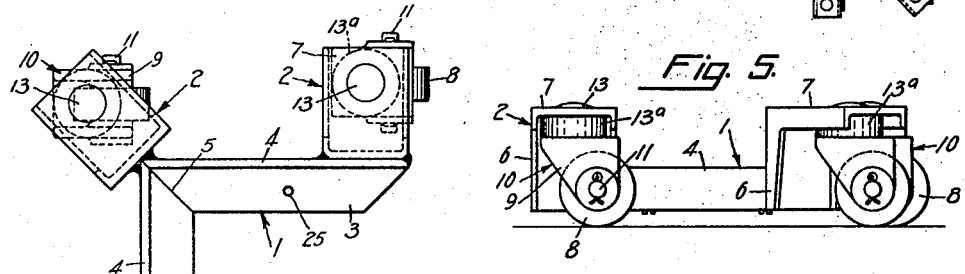
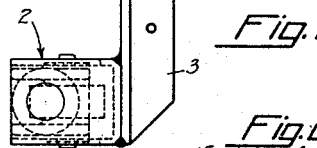
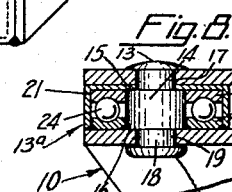
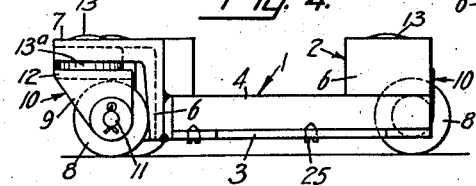
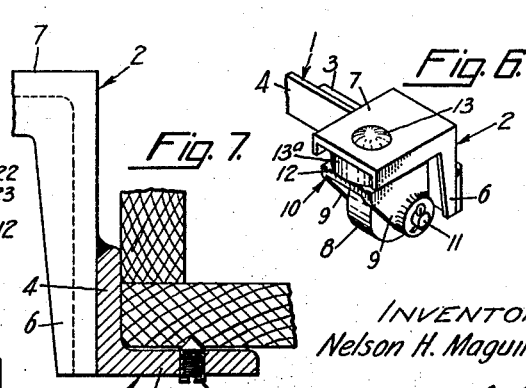
INVENTOR
Nelson H. Maguire
By
ATTORNEY Patented June 24, 1941

2,247,096

UNITED STATES PATENT OFFICE 2,247,096

MOVER'S DOLLY

Nelson H. Maguire, Hartford, Conn.

Application April 7, 1939, Serial No. 266,597

10 Claims. (Cl. 280—61)

My invention relates to mover's dollies.

It has among its objects to provide an improved dolly, and, more particularly, such an improved dolly especially adapted to reduce the labor and time heretofore required in moving heavy show cases, cabinets, packing cases, or the like. A further object of my invention is to provide such an improved dolly having an improved case engaging structure and an improved cooperating multi-wheeled structure and one especially adapted to use with an article having a right angled corner. A still further object is to provide such an improved dolly having an angular case supporting frame of an improved underslung construction enabling the same to be inserted with facility in operative position under such a corner. Still another object is to provide such a dolly adapted to provide a very stable corner support and one free from tilting and which is also of such strength as to be adapted to use with even the heaviest cases. These and other objects and advantages of my improved construction will, however, hereinafter more fully appear.

In the accompanying drawing, I have shown for purposes of illustration one embodiment which my invention may assume in practice.

In the drawing:

Figure 1 is a front elevation of a long and heavy show case supported by two of my improved dollies;

Fig. 2 is a plan view of Figure 1;

Fig. 3 is a plan view of one of the dollies of Figure 2 on an enlarged scale;

Fig. 4 is a front elevation of the dolly of Figure 3;

Fig. 5 is a rear elevation of the dolly of Figure 3;

Fig. 6 is a detail perspective view showing one of the wheeled supporting units;

Fig. 7 is an enlarged sectional detail taken adjacent one of the wheeled supporting units, and Fig. 8 is a sectional detail of the swiveled support for a wheel.

In this illustrative construction, I have shown my improved dolly as comprising a right angular frame, or base, 1 having three wheeled supporting units 2 secured to the outer margin of the frame and providing a right angular base within the wheeled supports to receive the corner of a show case, or packing case, as shown in Figure 2. It will be understood that two of these dollies may be used at diagonally opposite corners of the case, as shown in the figure, or, if desired, a dolly may be inserted under each of the four corners of the case.

As herein shown, the frame 1 is of improved construction. Herein, it is formed of right angularly related members of angle iron having horizontally disposed legs 3 and vertically disposed legs 4. Legs 3 and 4 herein are mitred at their meeting ends 5 and welded together to produce a right angled corner. Thus, a support is provided which is adapted to receive a corner of the case to be moved, with the legs 3 constituting a horizontal support, or base, on which the bottom of the case rests, while the upstanding legs 4 engage adjacent sides of the case and locate the case on the base.

The wheeled supporting units 2, which support the frame, as shown, are preferably identical, each comprising a channel member of angular shape having a vertical leg 6, which is secured to the outer face of an angle leg 4, and a horizontal leg 7 which forms the support for a caster wheel 8. Also, these wheels are journalled between the arms 9 of a depending U-shaped wheel support 10 on a horizontal shaft 11 which extends through the wheel and the arms 9 of the support in a usual manner to permit the wheel to rotate freely.

A horizontal connecting portion 12 of wheel support 10 is mounted for free pivotal movement about a vertical pivot shaft 13 which is fixed in the horizontal leg 7, a suitable anti-friction bearing 13a being provided between the connecting portion 12 and the horizontal web of leg 7. As shown most clearly in Figure 8, the shaft 13 has an intermediate enlarged portion 14 forming upper and lower shoulders 15 and 16 and a reduced upper end 17 which is closely received in a hole in the web of leg 7 and extends slightly therebeyond to provide a portion which can be peened over to rigidly fix the shaft 13 to the horizontal leg 7. At its lower end, below the shoulder 16, the shaft 13 has a similar reduced portion 18 which is freely rotatable in a hole 19 in the connecting portion 12 and which terminates in an enlarged end 20 which overlies the bottom face of the connecting portion 12. As here shown, the anti-friction bearing comprises a usual ball bearing having an inverted cup-shaped housing 21 which is fixed between the shoulder 15 and the web of leg 7 between the side flanges thereof, and spaced upper and lower ball races 22 and 23, fixed to said housing 21 and connecting portion 12, respectively, between which the usual ball bearings 24 are arranged.

In accordance with my invention, one of the wheel supporting units 2 is connected to each of the angle members comprising the base 1 at the free end thereof with the leg 7 extending outwardly at right angles thereto, and a third wheel supporting unit 2 is connected at the corner 5 with its leg 7 projecting outwardly at 45° to the angle members. It will be noted that all the wheel supporting units are disposed outside the margin of the supporting frame and, further, that the unit at the apex of the angle members comprising the frame, as well as the corner of the base, lies well outside a line drawn through the vertical pivots 13 of the wheeled supporting units at the ends of the angle members. Thus, when the corner of a case is disposed in the corner of the dolly, the intermediate wheel supporting unit stabilizes the dolly. As shown most clearly in Figure 7, the lower ends of the vertical legs 6 of the wheel supports overlie and are secured, as by welding, to the outer vertical faces of the legs 4, these depending legs 6 being of such length that the horizontal legs 3 of the supporting frame are supported just above the surface on which the wheels 8 rest. While not necessary, in order to prevent lateral displacement of the case on the base of the dolly, as, for example, if in moving the case the dolly should strike some object, a pointed threaded screw 25 is provided substantially midway in the leg 3 of each of the angle members, which can be adjusted to project upwardly above the base to embed its pointed end in the case. Obviously, if not desired, these screws can be backed off so that they will not project above the base.

In the use of my improved dolly, the case to be moved is raised slightly above the floor to permit the underslung platform, or base, of the dolly, comprising the horizontal angularly related legs 3, to be inserted under a corner of the case with the adjacent sides of the case engaging the upstanding legs 4 of the frame. Another dolly is similarly inserted under the diagonally opposite corner, and it will be understood that additional dollies may be used on the two remaining corners if the weight of the case makes this desirable. Ordinarily, however, two dollies located at diagonally opposite corners, as shown in Figure 2, provide sufficient support. Due to the ball bearing pivotal support for the wheels 8, great freedom of movement is possible, the case being movable as easily in one direction as in another. When the case has been moved to the desired location, the case can be lifted slightly to permit removal of the dollies in an obvious manner.

As a result of my improvements, it will be evident that I have provided a multi-wheeled dolly which can be very readily inserted laterally and with a minimum of effort under the corner of a heavy case. Moreover, the wheeled supports being located wholly outside the margin of the case thereon, the base of the dolly on which the case rests can be located very close to the floor while at the same time enabling the use of wheels of sufficient diameter to enable very heavy objects to be handled with ease, even on surfaces which are uneven. It will also be evident that I have provided a dolly having two wheel supports disposed on opposite sides of a right angle corner and a third wheel support at the apex for stabilizing the dolly and enabling it to support the corner of a case regardless of the direction of movement desired. It will further be evident that my improved dolly can be very inexpensively manufactured, since it comprises a minimum of standard structural shapes and standard caster wheels, and that a very rugged dolly is produced which is extremely convenient to use.

While I have in this application specifically described one embodiment which my invention may assume in practice, it will be understood that this form is shown for purposes of illustration, and that the invention may be modified and embodied in other forms without departing from its spirit or the scope of the appended claims.

What I claim as new and desire to secure by Letters Patent is:

1. In a mover's dolly, a truck including side and apex wheel supports disposed to include the limits of a right angled triangle having its apex extending to adjacent said apex support, wheels on said supports, and means connecting said supports forming a load supporting platform therebetween and disposed below the tops of said wheels and said platform being laterally unobstructed to enable a load to be inserted laterally between said side wheel supports and having the unobstructed portion included within said triangle and of sufficient width to permit the apex of a right angled corner of an article comprising the load to be disposed adjacent the apex of said triangle.

2. In a mover's dolly, a truck including side and apex wheel supports disposed to include the limits of a right angled triangle having its apex extending to adjacent said apex support, wheels swiveled on said supports, means connecting said supports having a load supporting platform therebetween and disposed below the tops of said wheels and said platform being laterally unobstructed to enable a load to be inserted laterally between said side wheel supports and having the unobstructed portion included within said triangle and of sufficient width to permit the apex of a right angled corner of an article comprising the load to be disposed adjacent the apex of said triangle, and load positioning means on said platform raised above the latter and having spaced abutments for engaging opposite sides of said right angled corner of the article inserted between said side supports.

3. In a mover's dolly, a truck including side and apex wheel supports disposed to include the limits of a right angled triangle having its apex extending to adjacent said apex support, wheels swiveled on vertical axes on said supports, and means connecting said supports having a load supporting platform therebetween and disposed below the tops of said wheels and said platform being laterally unobstructed to enable a load to be inserted laterally between said side wheel supports and having the unobstructed portion included within said triangle and of sufficient width to permit the apex of a right angled corner of an article comprising the load to be disposed adjacent the apex of said triangle, said platform having a horizontally disposed portion opposite said unobstructed portion and adjacent the apex of said triangle for supporting the extremity of the right angled corner of the article inserted between said side supports.

4. In a mover's dolly, a truck including a rigid supporting platform, two sides of which meet at approximately right angles, means on said meeting sides of said platform to retain a load thereon, supports for ground engaging means extending above said platform and located on said meeting sides, and ground engaging means secured to said supports.

5. In a mover's dolly, a truck including a rigid supporting platform, two sides of which meet at approximately right angles, load positioning and retaining means extending above said platform on said meeting sides including supports for ground engaging means, and ground engaging means secured to said supports located outside the lateral limits of said platform and extending above the latter.

6. In a mover's dolly, a truck including a rigid supporting platform, two sides of which meet at approximately right angles, and having an inner substantially right angled indentation between said sides, load positioning and retaining means extending above said platform on said meeting sides including supports for ground engaging means, and ground engaging means secured to said supports.

7. In a mover's dolly, a truck including a rigid supporting platform, two sides of which meet at approximately right angles, load positioning and retaining means extending above said platform on said meeting sides including a plurality of supports for ground engaging means, one of which is located at the platform apex, and ground engaging means comprising swivelled wheel means on said supports.

8. In a mover's dolly, a truck including a rigid supporting platform comprising a narrow marginal article supporting shelf presenting an article receiving corner and having substantially right angle inner and outer margins, load positioning and retaining means extending above said shelf, a plurality of wheel supports including one secured at the platform apex, and swivelled wheel means on said support outside the outer margin of said shelf.

9. In a mover's dolly, a truck including a rigid supporting platform, two sides of which meet at approximately right angles, means on said meeting sides of said platform to retain an article thereon, supports for ground engaging means extending above said platform and located on said meeting sides, and ground engaging means secured to said supports, said supporting platform being adjacent the bottom of said ground engaging means and insertable laterally under the article.

10. In a mover's dolly, a wheel supported frame having its outer periphery comprising adjacent sides meeting substantially at right angles, said frame having upstanding means along its outer periphery and a lower supporting surface open along its inner periphery and adapted to be slid in under the corner of a casing or the like, said wheels being disposed outside said upstanding means, and caster supporting members fixed to said frame outside the latter including a pair extending at right angles to each other at opposite ends of said frame and an intermediate member disposed at an equal angle to each of said pair and fixed to the apex of said frame.

NELSON H. MAGUIRE.

CERTIFICATE OF CORRECTION.

Patent No. 2,247,096. June 24, 1941.

NELSON H. MAGUIRE.

It is hereby certified that error appears in the printed specification of the above numbered patent requiring correction as follows: Page 3, second column, line 3, claim 8, for the word "support" read --supports--; and that the said Letters Patent should be read with this correction therein that the same may conform to the record of the case in the Patent Office.

Signed and sealed this 2nd day of September, A. D. 1941.

(Seal)

Henry Van Arsdale,
Acting Commissioner of Patents.